United States Patent
Morozov

(10) Patent No.: US 12,128,559 B2
(45) Date of Patent: Oct. 29, 2024

(54) SELF-RECONFIGURING MODULAR ROBOT WITH RETRACTABLE WHEEL MECHANISMS

(71) Applicant: Igor Morozov, Odessa (UA)

(72) Inventor: Igor Morozov, Odessa (UA)

(*) Notice: Subject to any disclaimer, the term of this patent is extended or adjusted under 35 U.S.C. 154(b) by 632 days.

(21) Appl. No.: 17/512,843

(22) Filed: Oct. 28, 2021

(65) Prior Publication Data

US 2022/0048183 A1 Feb. 17, 2022

Related U.S. Application Data

(63) Continuation-in-part of application No. PCT/UA2020/000003, filed on Jan. 15, 2020.

(51) Int. Cl.
*B25J 9/08* (2006.01)

(52) U.S. Cl.
CPC ...................... *B25J 9/08* (2013.01)

(58) Field of Classification Search
CPC ........................................................ B25J 9/08
See application file for complete search history.

(56) References Cited

U.S. PATENT DOCUMENTS

| | | | |
|---|---|---|---|
| 6,605,914 B2 | 8/2003 | Yim | |
| 9,682,479 B2 * | 6/2017 | Lin | B25J 9/08 |
| 10,857,670 B2 * | 12/2020 | Rus | B25J 9/08 |
| 11,726,942 B2 * | 8/2023 | Yi | G06F 13/4031 |
| | | | 710/104 |
| 11,951,414 B2 * | 4/2024 | Yim | A63H 30/02 |
| 2012/0122059 A1 | 5/2012 | Schweikardt | |
| 2014/0227935 A1 * | 8/2014 | Yoon | A63H 33/046 |
| | | | 446/92 |
| 2014/0274416 A1 | 9/2014 | Brandwijk | |
| 2016/0005331 A1 | 1/2016 | Ryland | |
| 2016/0325429 A1 | 11/2016 | Rus | |

FOREIGN PATENT DOCUMENTS

| | | |
|---|---|---|
| CN | 206475179 U | 9/2017 |
| CN | 107925680 A | 4/2018 |
| CN | 108527350 A | 9/2018 |
| GB | 2533314 | 6/2016 |

* cited by examiner

*Primary Examiner* — Kevin Hurley
*Assistant Examiner* — Hosam Shabara
(74) *Attorney, Agent, or Firm* — Boris Leschinsky

(57) ABSTRACT

A self-reconfiguring modular robot is made in a form of a cube and has retractable wheel mechanism on every edge thereof. The retractable wheel mechanism comprises two motorized wheels which may be used to (i) move the robot, and (ii) to provide for secure attachment to or detachment from an adjacent modular robot by engaging in a firm, load-bearing manner with a corresponding retractable wheel mechanism of the other robot. The ability to easily connect and disconnect with other modular robots on any side of the cube provides for endless possibilities of construction and rapidly changing a variety of complex forms for a group of modular robots. Advantageously, self-assembly and subsequent change in the form taken by a group of robots is done autonomously using internal controller software and without any manual steps.

20 Claims, 11 Drawing Sheets

SELF-RECONFIGURING MODULAR ROBOT WITH RETRACTABLE WHEEL MECHANISMS

CROSS-REFERENCE DATA

This US Patent Application is a continuation-in-part of my co-pending PCT application No. PCT/UA2020/000003 with the same title filed 15 Jan. 2020, in turn claiming priority to UA Patent application No. 201910461 filed 18 Oct. 2019, all incorporated herein in their respective entireties by reference.

BACKGROUND

Without limiting the scope of the invention, its background is described in connection with self-reconfiguring modular robotic systems, and more particularly a self-reconfiguring modular robot that can be configured to connect to and disconnect from same or similar modular robots in various configurations—aimed to create a new form that provides new functional capabilities.

Modular robots are generally known in the art, for example those described in U.S. Pat. No. 6,605,914, and US Patent Application Nos. 20160005331 and 20160325429. However, these modules need to be manually connected to each other so as to provide the final desired configuration and functionality. Another limitation of the prior art is in a weak method of attaching one robotic module to another, such as using easily breakable magnetic connections.

A common drawback that prevents the widespread adoption of modular robots in everyday life is that existing modular robots need to be assembled or reconfigured manually or with the use of additional adapters to begin performing their desired function. If the known modular robots and their systems use only magnetic contacts to connect with each other, then the forms, created by them, have an unreliable construction design that can easily collapse and are not intended for withstanding any significant mechanical vibration and loads.

The need exists therefore for a flexible self-configuring system capable of connecting together a variable number of individual robotic modules so as to fit more than one objective.

SUMMARY

Accordingly, it is an object of the present invention to overcome these and other drawbacks of the prior art by providing a novel modular robot adapted for self-reconfiguring assembly and operation with other modular robots.

The essence of this invention is creation of a self-reconfiguring modular robot with retractable wheel mechanisms, which can operate as a self-reconfiguring modular robotic system in a group with other similar or identical modular robots. Each modular robot of such system may be made capable of autonomous movement, independent connecting and disconnecting with other modular robots, and independent movement on flat or other surfaces, such as those made from other modular robots. This system may be useful for building various mechanically connected forms including a flexible form in the X, Y, and Z planes.

The self-reconfiguring modular robot may be made with a housing in the form of a cube, with retractable wheel mechanisms, equipped with a controller, a plurality of electric motors, a wireless RF module and a rechargeable battery. One, several or all the cube edges may be equipped with grooves housing identical retractable wheel mechanisms.

Each retractable wheel mechanism in each groove in turn may comprise a pair of motorized wheels. Each motorized wheel may be configured for rotation about a common wheel axis when energized by a wheel motor operatively engaged therewith. Each wheel may be equipped with a non-slip lateral engagement system configured for a non-rotational engagement when pressed with an adjacent wheel of another modular robot positioned at the side thereof on the same common wheel axis. Each wheel may be further configured to move laterally along the common wheel axis when urged by a laterally moving lever supporting the wheel on one end thereof.

The retractable wheel mechanism may be further configured to be moved between a retracted position within the boundaries of the cube and an extended position by a retracting mechanism energized by a retracting motor operatively engaged therewith. In this case, the extended position is defined by the wheels extending beyond the boundaries of the cube.

The goal of this design is to allow each pair of wheels of each retractable wheel mechanism to be independently configured to extend and retract and individually rotate on demand when in the extended position. While in the extended position, rotation of the wheels may be used to move the robotic module. Bringing the wheels closer together or further apart along their axis of rotation may be used to cause engagement of one robotic module with another as described in greater detail below.

The design of each modular robot allows making independent mechanical connections and disconnections of one modular robot with another or other similar modular robots in X, Y, and Z planes. This allows to build and change, if necessary, the system assembly formed by a group of modular robots.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
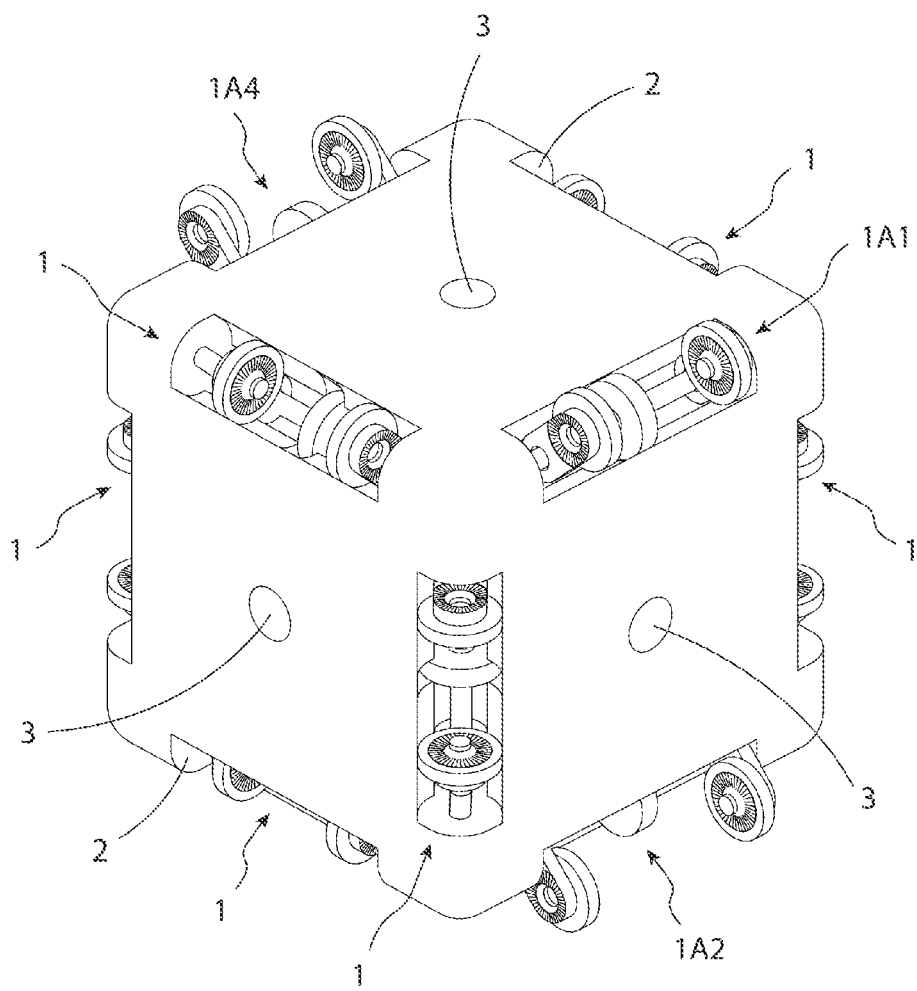
FIG. 1 is a general view of a modular robot in the form of a cube.

The following position numbers are used in the drawings:
1. retractable wheel mechanism;
2. groove for the retractable wheel mechanism;
3. position sensor located on each cube face of the modular robot;
4. wheels of the retractable wheel mechanism;
5. electric motor that drives the wheels;
6. wheel protrusions;
7. wheel teeth;
8. groove located on the lever;
9. lever teeth;
10. lever;
11. shaft;
12. electric motor housing;
13. electric motor that rotates the shaft;
14. mechanism housing for extend and retract the retractable wheel mechanism;
15. induction coil for wireless charging;
16. electronic controller;
17. rechargeable battery.

DETAILED DESCRIPTION OF PREFERRED EMBODIMENTS OF THE INVENTION

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 illustrates a general view of a modular robot having a housing in the form of a cube, each edge of which is made with a groove 2 having a cutout space in which a retractable wheel mechanism 1 may be placed. The groove 2 may be sufficiently large to position the retractable wheel mechanism within thereof and without extending beyond the boundaries of the cube when the wheels of each retractable wheel mechanism are in their respective retracted position. The retractable wheel mechanism may be used for independent movement of the modular robot on a surface, as well as to connect one modular robot to another similar or identical modular robot. Self-assembly of a plurality of modular robots on other modular robots allow building together of an assembly in a desired shape by a group of identical modular robots without the need of attaching one modular robot to another one manually. FIG. 1 shows an example of some edges of the cube with extended wheel mechanisms (positions 1A1, 1A2, 1A4), while other grooves have these mechanisms in their respective retracted position. A position sensor 3 may be placed on one, several, or all faces of the cube of the modular robot.

Figure 2:
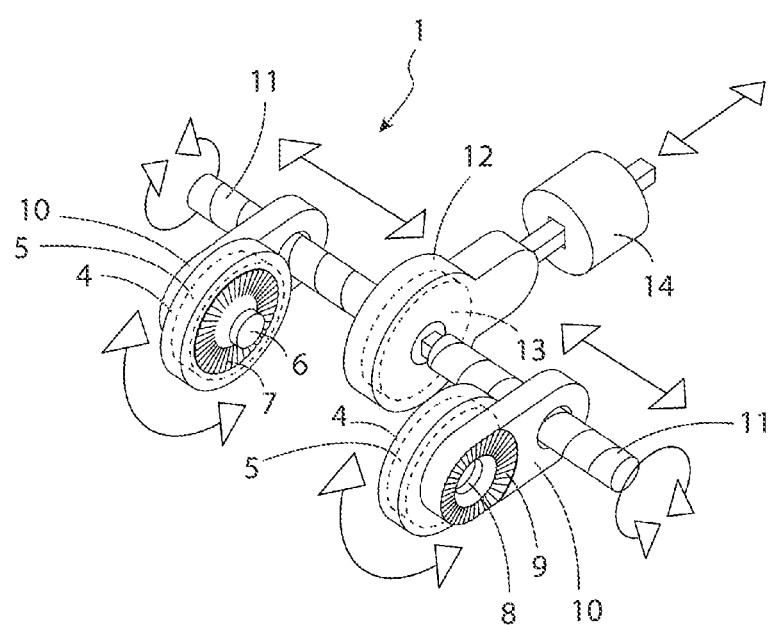
FIG. 2 is a retractable wheel mechanism of the modular robot.

FIG. 2 illustrates the design and operation of the retractable wheel mechanism 1 of the modular robot. The mechanism consists of a pair of motorized wheels 4, which can be caused to rotate in one or both directions using an electric hub motor 5. As an alternative to the electric motor, an ultrasonic or a piezoelectric motor may also be used in the wheel hub. A pair of wheels 4 may be located on respective levers 10, each lever 10 supporting the wheel 4 on the first end is having a second end opposite the first end. The retractable mechanism further comprises a shaft rotatably connecting second ends of both respective levers, for example by using a ball-screw mechanism. Shaft 11 in turn may be rotated by an electric motor 13, located in the housing 12, causing respective levers to move closer together or, when reversed, to move further apart. In alternative embodiments, linear actuators such as piezoelectric linear motors and actuators may be used to extend and retract the wheels of the retractable mechanism, as the invention is not limited in this regard.

Each wheel 4 may have a non-slip lateral engagement system configured for a non-rotational engagement when pressed with an adjacent wheel of another modular robot positioned at the side thereof on the same common wheel axis. The non-slip engagement system may include a wheel protrusion 6 configured to connect to the opposite identical wheel mechanism of the connected modular robot with grooves 8, which may be located on the levers 10. As an alternative to the described electric motor, the modular robot may be equipped with piezoelectric motors, ultrasonic motors, or other motors as the invention is not limited in this regard. As a further alternative, the movement of the levers 10 along the shaft 11 can be caused by known linear movement mechanisms, mechanical guides or other mechanisms suitable to move and fixate in place the retractable wheel mechanism 1.

In addition, wheels 4 may have teeth 7 and levers 10 may have teeth 9, which may be used to prevent slippage between the wheel 4 and the lever 10 of the modular robots connected to each other during the rotation of wheels 4. Teeth 7 and 9 can be also equipped with other non-slip surfaces of different textures. Other alternative designs for a non-slip lateral engagement system may include a magnetic coupling using pair of magnets, with one magnet located on one wheel and the other magnet located on the corresponding wheel of another robot. Wheel engagement in this case is enforced by detachable engagement of the magnets when they are placed in a vicinity of each other.

The retractable wheel mechanism 1 may be extended and retracted from the groove 2 located on each edge of the cube via a screw mechanism or a linear movement mechanism, actuated by electric motor or linear actuator located in the housing 14. The length of the shaft 11 may be designed to place up to four retractable wheel mechanisms connected to each other. Accordingly, two (see FIG. 7), three (see FIG. 8) and four (see FIG. 9) modular robots can be connected to each other.

Figure 3:
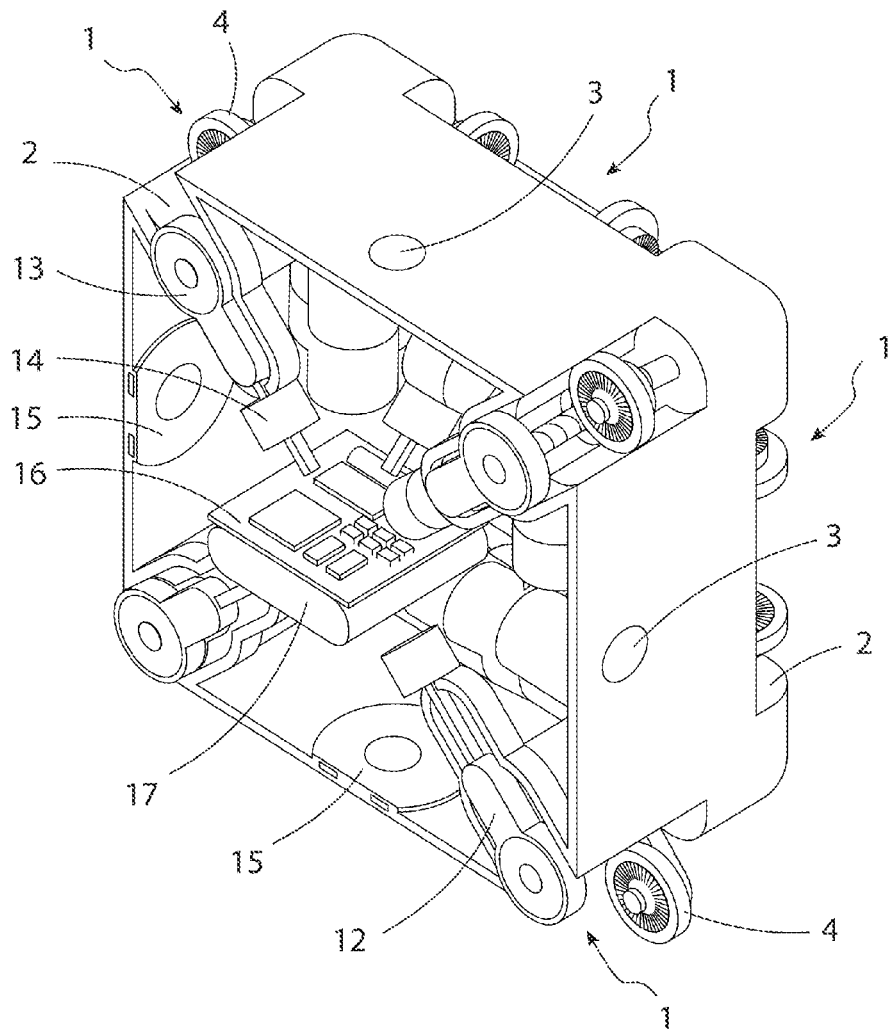
FIG. 3 is a cross-sectional view of the modular robot housing.

FIG. 3 illustrates control elements of the modular robot and shows a partial cross-section through the modular robot housing, where a visible portion of the retractable wheel mechanism 1 is located in the grooves 2. The cross-sectional cut of the electric motor 13 and the mechanism housing 14 are illustrated to show how to extend and retract the retractable wheel mechanisms 1.

Each individual modular robot may have a specially designed circuit board electronic controller 16 with a microprocessor, memory, optional accelerometer, wireless RF module and a rechargeable battery 17. The microprocessor controller may be used to process and execute transmitted or pre-recorded programs or commands communicated over the wireless RF module. Such commands may be needed to determine the position, movement, assembly of shapes and desired changes of the assembly shape by group of modular robots. The accelerometer and position sensor 3 may be used to determine the inclination angle and position of a modular robot in space and the position of one modular robot relative to other modular robots. On the inner side of the position sensor 3 there may be placed an induction coil configured for wireless charging 15, which may be used to charge batteries of a single modular robot or of a group of connected modular robots. The wireless RF module may also be used to receive and transmit data that can be sent from a desktop, laptop, tablet or smartphone via a specially designed cross-platform modular robot system management program. Commands or data may also be sent from one modular robot to another modular robot or a group of modular robots.

Alternatively, a group of modular robots can be programmed as a semi-autonomous or fully autonomous system that performs a pre-recorded program or function. As an additional option, one or more robot of the plurality of modular robots may be equipped with a GPS navigation module to determine the position of one modular robot or a group of modular robots assembled or operated together.

Figure 4:
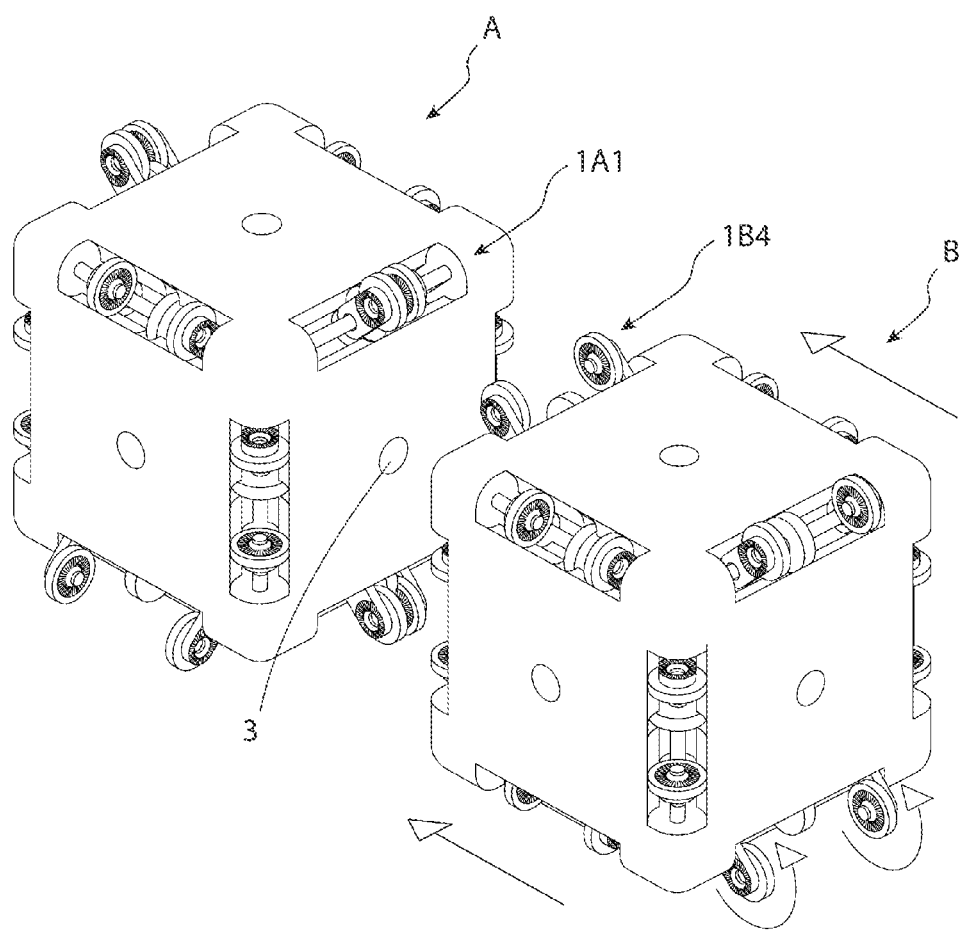
FIG. 4 illustrates the movement of the modular robot.

Movement and turns of the modular robot are now described in greater detail. Using a cubical shape of each robot makes it easy to assemble one robot to the other, regardless of which side of the modular robot is up or down, as all the cube edges have hidden retractable wheel mechanisms on them. A built-in accelerometer may be used to determine which side of the cube is down and closer to the surface underneath. The computer program of the controller may be adapted to give a command to extend the retractable wheel mechanisms 1 from the bottom edges of the cube for further movement on the surface and for further connection to other identical modular robots. FIG. 4 illustrates the movement of the modular robot B to the modular robot A to connect the 1B4 retractable wheel mechanism with the 1A1 retractable wheel mechanism.

Figure 5:
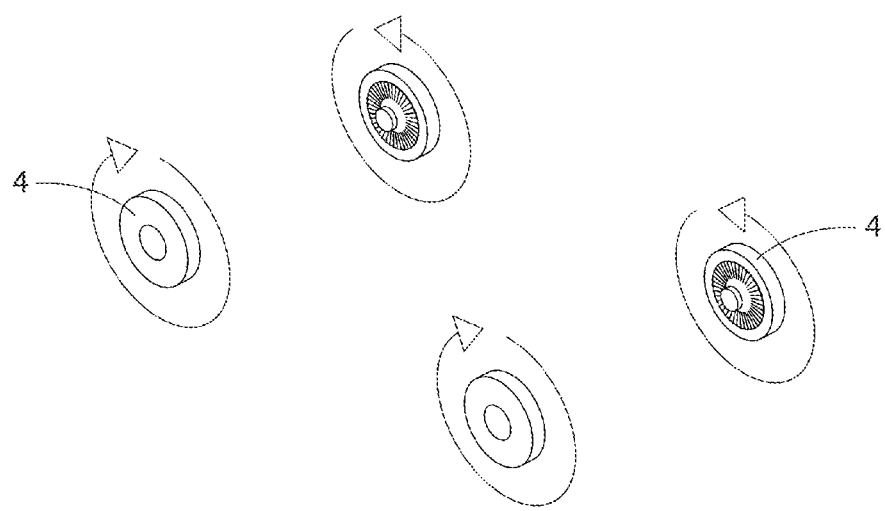
FIG. 5 illustrates the direction of movement of the modular robot wheels for turning.

To perform a turn or a spin, the modular robot may use the extended two opposing retractable wheel mechanisms 1 on the side of the surface on which it is moving. FIG. 5 illustrates the direction of movement of the wheels 4 of the retractable wheel mechanisms 1 for turning. The wheels located on one shaft may rotate in the opposite direction relative to each other, while the wheels on the other, parallel to the shaft, may replicate the same direction of rotating. Therefore, the modular robot can perform turns and spins as desired.

Figure 6:
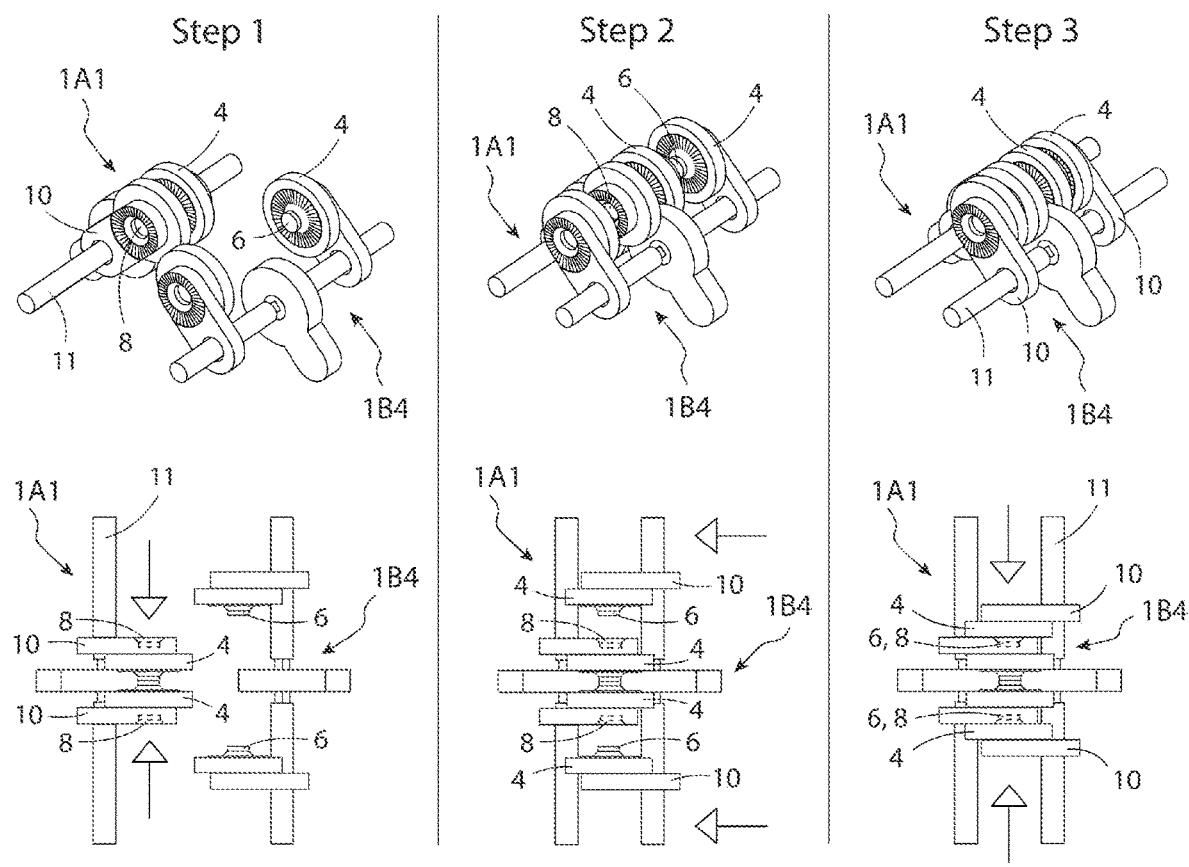
FIG. 6 illustrates the step-by-step connection of the wheel mechanisms of the modular robot.

Connection between two modular robots is described with reference to FIG. 6 which illustrates the step-by-step connection process of the retractable wheel mechanisms 1A1 and 1B4 of two adjacent modular robots A and B, as generally seen in FIG. 4. The screw mechanism thread on the shaft 11 is omitted on FIG. 6 to simplify the illustration.

The connection between two robots may be performed using the following steps:

Step 1: Before connecting the two modular robots A and B, the modular robot A in the retractable wheel mechanism 1A1 moves the levers 10 with wheels 4 to the center, along the shaft 11.

Step 2: The modular robot B approaches the modular robot A until the wheels 4 of the 1B4 retractable wheel mechanism are on the same common wheel axis as the wheels 4 of the retractable wheel mechanism 1A1. The proximity of the modular robot B to the modular robot A is determined by the position sensors 3, which are shown in FIG. 4.

Step 3: Modular robot B in the retractable wheel mechanism 1 B4 moves the levers 10 with wheels 4 along the shaft 11 to the center, while the wheel protrusions 6 enter and engage with the grooves 8 located in the levers of the retractable wheel mechanism 1A1 of the modular robot A. Steps 1 and 2 in FIG. 6 and FIG. 2 illustrate the position of the wheel protrusions 6 in the inner side of the wheels and the grooves 8, located on the outer side of both levers.

Figure 7:
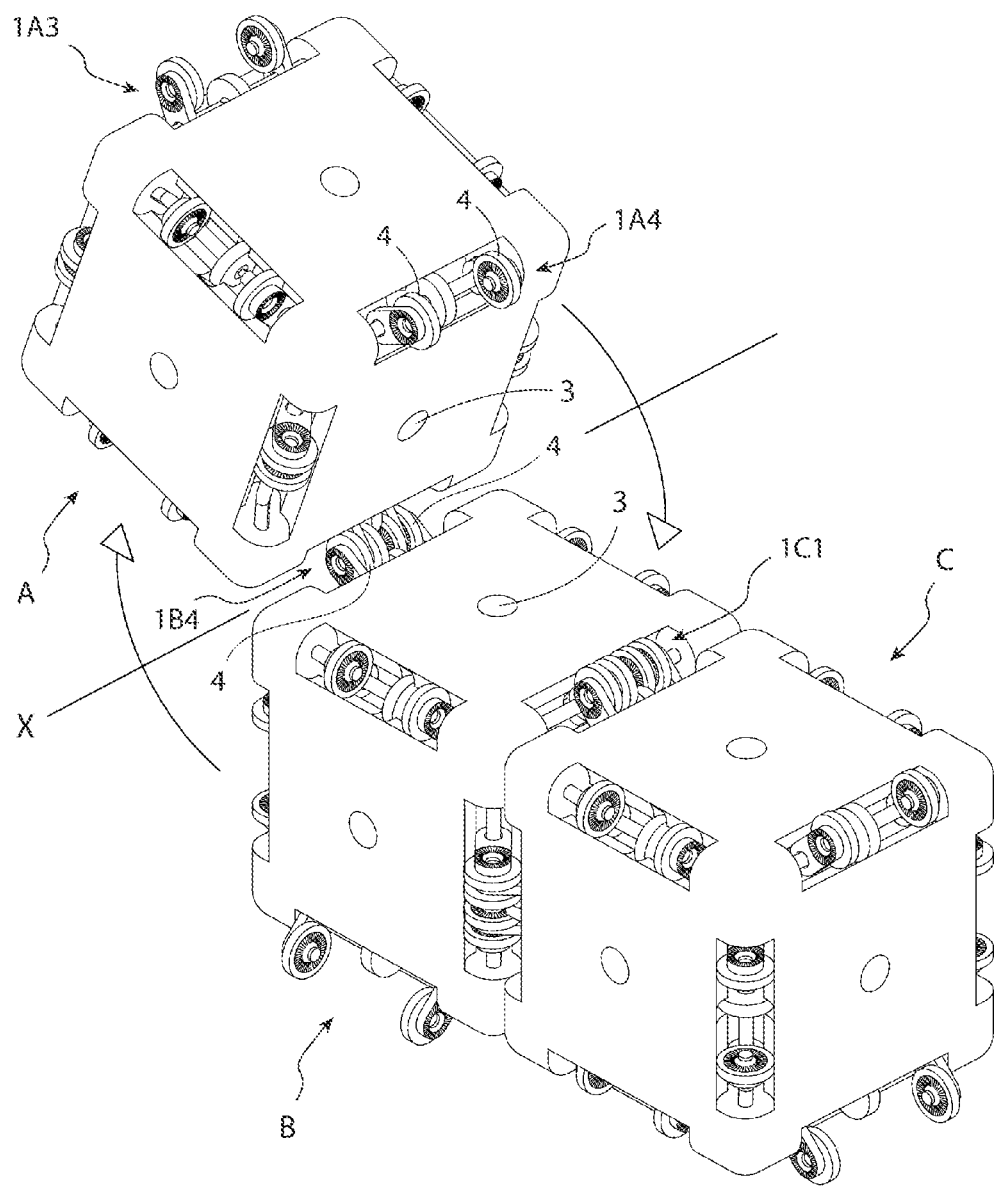
FIG. 7 illustrates the moment of self-assembly of a modular robot A on a modular robot B.

Remaining figured illustrate the assembly of various geometric shapes using a plurality of modular robots of the present invention. FIG. 7 illustrates assembly of a modular robot A onto a modular robot B. In this arrangement, modular robot C may be used as a counterweight. The assembly is possible after the connection of two opposed retractable wheel mechanisms. For the assembly, the modular robot B rotates wheels 4 in the connected retractable wheel mechanism 1B4 during which the modular robot A is moved on the modular robot B around the axis X. The rotation takes place until the position sensors 3 of the modular robot A indicates that it is connected to the modular robot B. At the time of the connection, the modular robot A has extended wheels 4 in the retractable wheel mechanism 1A4 for further connection to the retractable wheel mechanism 1C1 of the modular robot C, which is already connected to the modular robot B.

Figure 8:
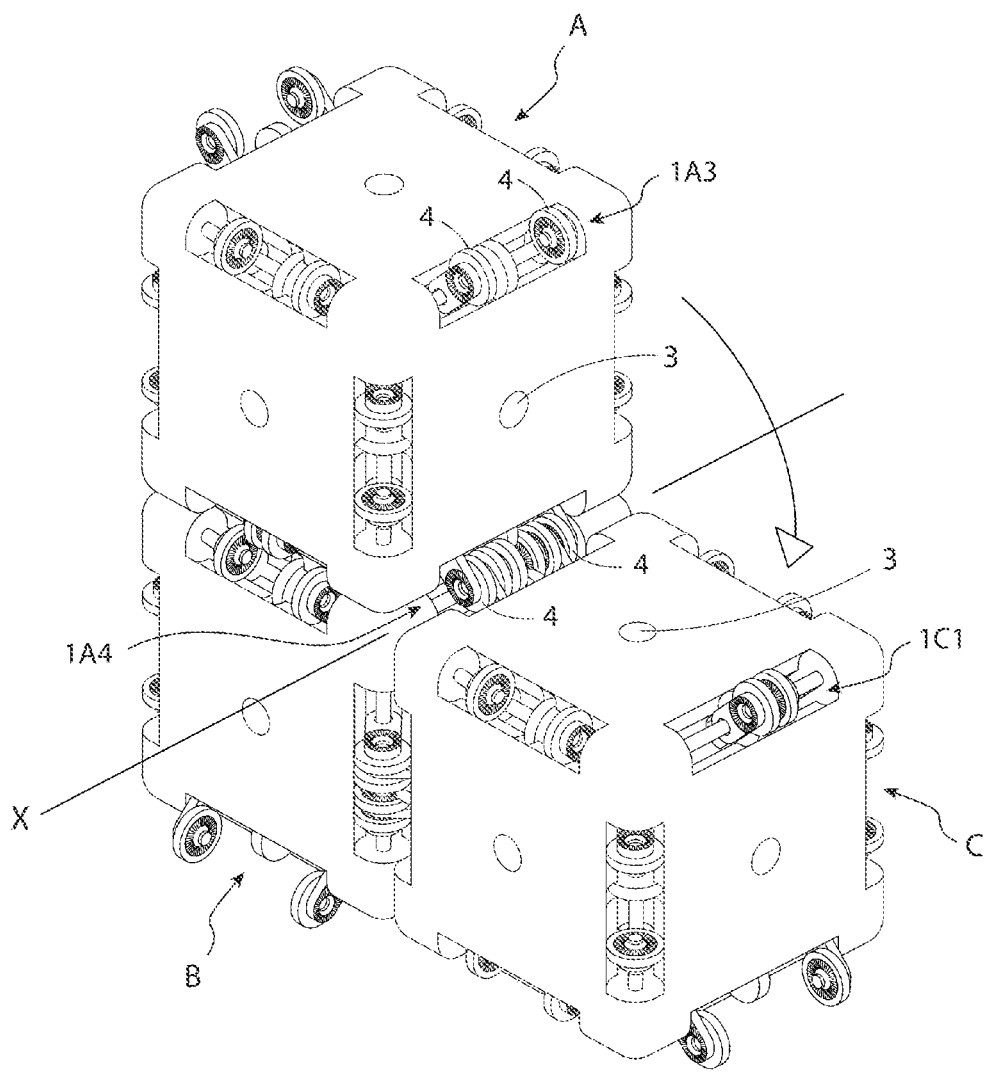
FIG. 8 illustrates the modular robot A assembled onto a modular robot B.

FIG. 8 illustrates an assembly of the modular robot A onto a modular robot B, where the retractable wheel mechanisms of three modular robots A, B and C are connected to each other along the axis X. In order to move the modular robot A further to the modular robot C, the retractable wheel mechanism 1 A4 of the modular robot A may rotate the wheels 4 until the position sensors 3 of the modular robot A confirm connection to the modular robot C. Before assembly, the modular robot A may have moved its motorized wheels in opposite directions in the retractable wheel mechanism 1A3. At the same time, following the connection to the retractable wheel mechanism 1C1 of the modular robot C, whose wheels may be moved towards to the center to secure the connection.

Figure 9:
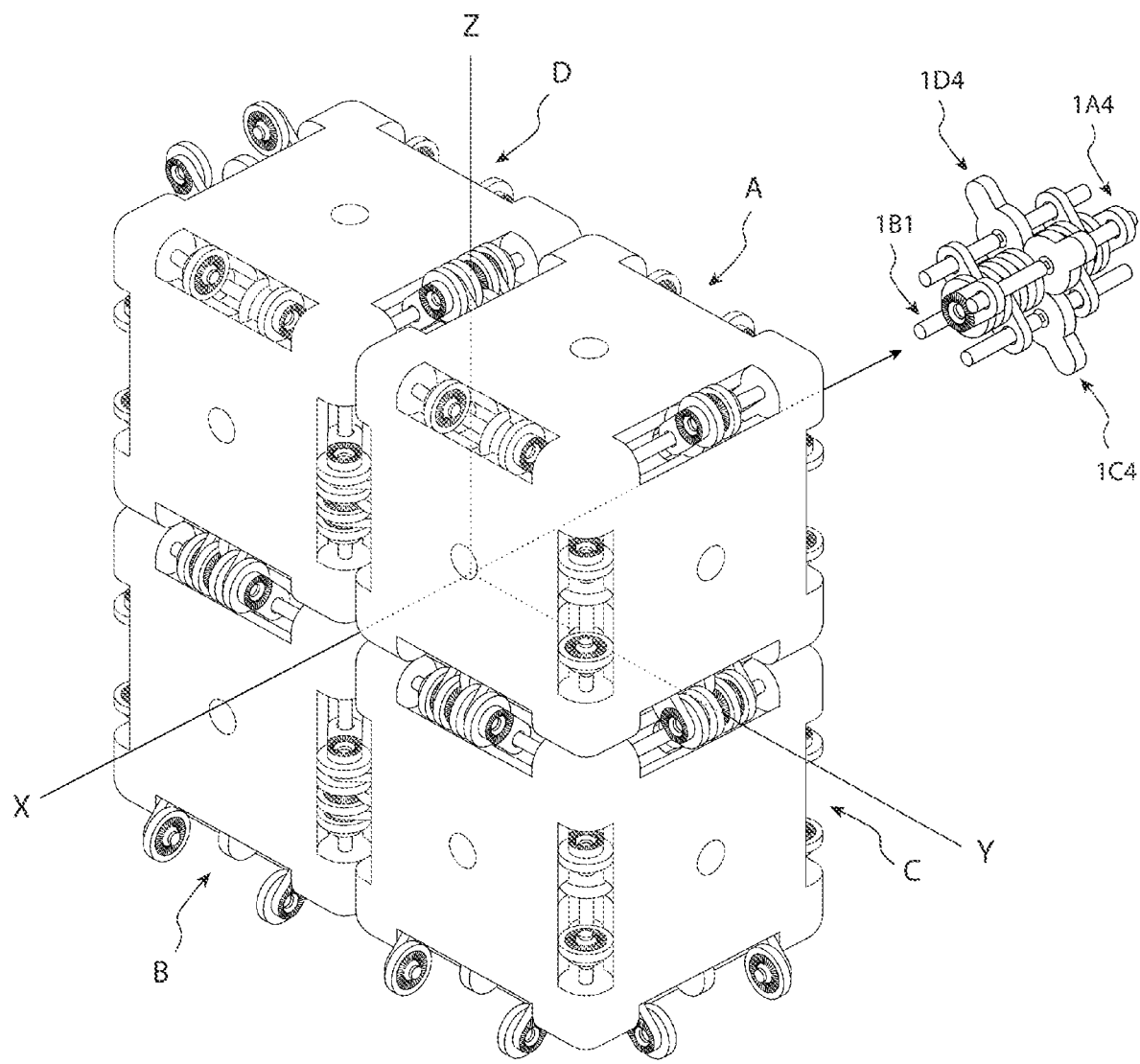
FIG. 9 illustrates four connected modular robots.

FIG. 9 illustrates four interconnected modular robots D, A, C, and B, where four of their retractable wheel mechanisms are connected together along the axis X. For clarity of connection, a partial figure of four retractable wheel mechanisms 1D4, 1A4, 1C4, 1B1 is placed to the right side of the figure with connected modular robots.

Figure 10:
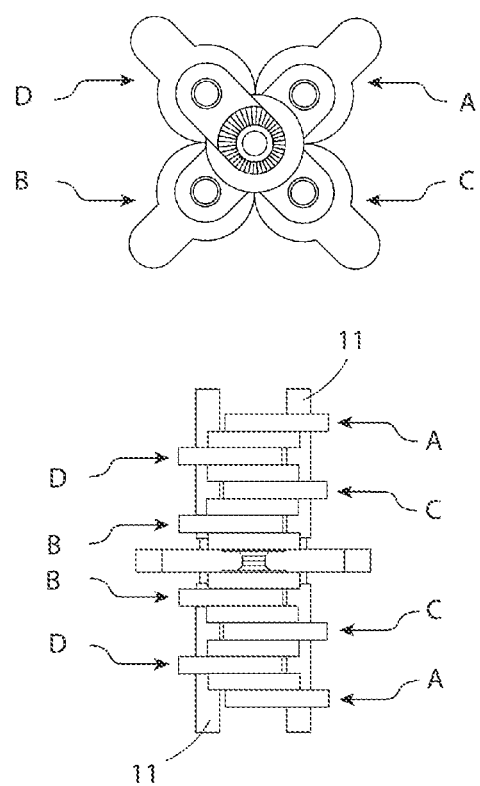
FIG. 10 illustrates four connected retractable wheel mechanisms.

FIG. 10 illustrates a simplified side and top views of the four connected retractable wheel mechanisms of modular robots D, A, C, B to each other. The shaft 11 length may be designed to place four pairs of connected wheels of respected wheel mechanisms 1. Thus, modular robots can move around independently or in connected assemblies and build different assembly shapes in the X, Y, and Z planes.

Figure 11:
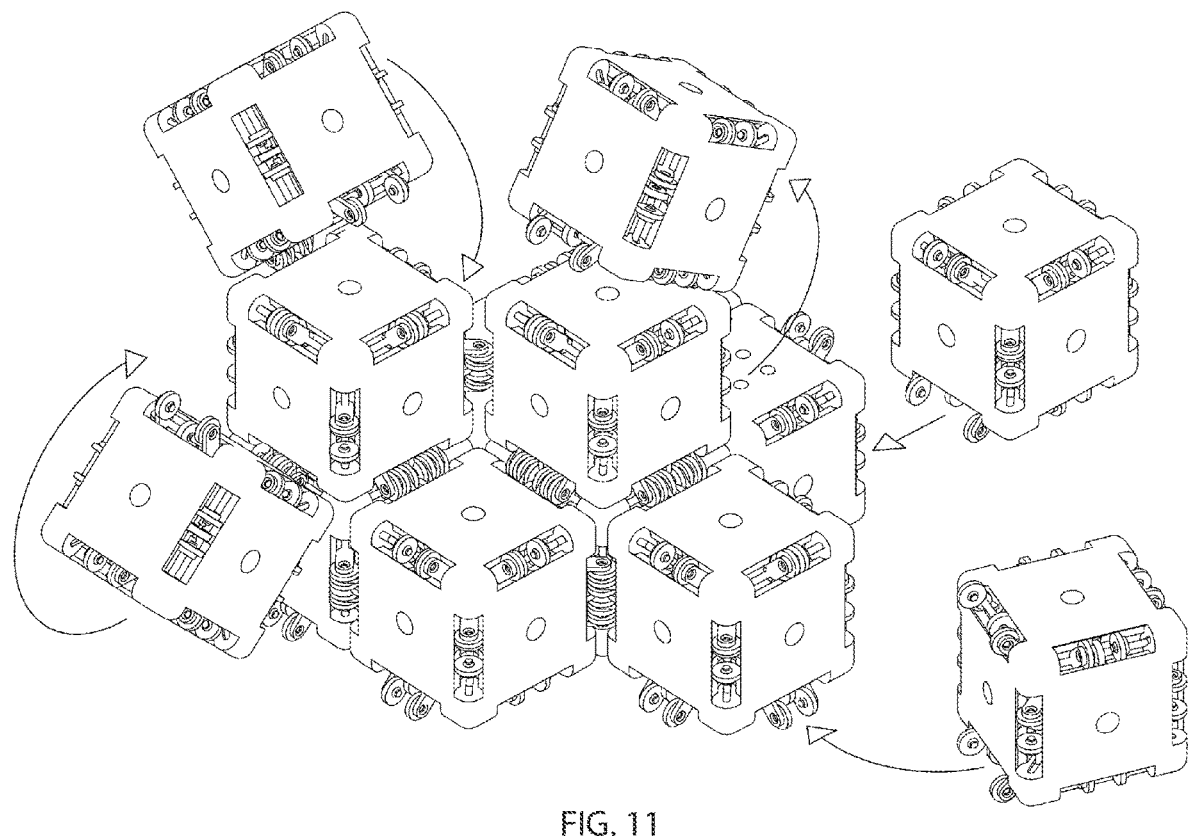
FIG. 11 illustrates the building or changing of the assembly form by a group of modular robots.

FIG. 11 illustrates moving, connecting and building modular robots by attaching them to each other for a desired assembly form.

Industrial use of the present invention takes advantage of its ability to self-assemble to create one or more self-reconfiguring modular robot systems with retractable wheel mechanisms. Modular robot groups can be made into assemblies of different sizes with their frames and mechanical parts made of different materials designed for various mechanical loads, depending on the task they need to perform. A suitable size and number of modules may be selected for each industrial task.

In addition, a group of modular robots can be connected to existing robots to perform additional joint or separate tasks and functions. Therefore, this invention offers a new approach that can extend and simplify the functionality and reconfiguration of existing robotics.

Since the modular robot has the form of a cube, a group of modular robots can be used for building or various art forms such as permanent or temporary installation structures. In interiors, modular robots can be used to assemble, disassemble and change interior objects such as walls, tables, chairs, wardrobes, shelves, etc. All desired forms or objects can be reconfigured and disassembled at the necessary moment depending on a transmitted or a pre-recorded computer program. A further use of the robots is to build static or dynamic sculptures, as well as representations of various dynamic or static shapes, art objects, landscapes, to supplement graphics and other media presentations.

Independent movement and self-assembly of various shapes by the modular robots of the present invention can also be used for military purposes, for example, to erect a protective shield or a shelter for soldiers in the field.

In further embodiments, the shape of the housing may be more than a cube. It is contemplated to have modular robots in the shape of a parallelepiped, triangle, pentagon, octagon, etc, as each respective edge of these housings of various shapes may be equipped with retractable wheel mechanisms configured for movement and assembly of one robot to the other.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A modular robot adapted for self-reconfiguring assembly and operation with other modular robots, the modular robot comprising:
a housing having a general shape of a cube defining six cube faces and eight cube edges at each intersection of a pair of cube faces,
each cube edge having a groove along thereof forming a cutout space for positioning a retractable wheel mechanism therein, the groove is sufficiently large to position the retractable wheel mechanism within thereof and without extending beyond the boundaries of the cube when the wheels of each retractable wheel mechanism are in their respective retracted position,
wherein the retractable wheel mechanism in each groove in turn comprising a pair of motorized wheels, each motorized wheel is configured for rotation about a common wheel axis when energized by a wheel motor operatively engaged therewith, each wheel is equipped with a non-slip lateral engagement system configured for a non-rotational engagement when pressed with an adjacent wheel of another modular robot positioned at the side thereof on the same common wheel axis, each wheel is further configured to move laterally along the common wheel axis when urged by a laterally moving lever supporting the wheel on one end thereof,
wherein the retractable wheel mechanism is further configured to be moved between a retracted position within the boundaries of the cube and an extended position by a retracting mechanism energized by a retracting motor operatively engaged therewith, the extended position is defined by the wheels extending beyond the boundaries of the cube,
whereby each pair of wheels of each retractable wheel mechanism is independently configured to extend and retract and individually rotate on demand when in the extended position.

2. The modular robot as in claim 1, wherein each lever supporting the wheel on the first end is having a second end opposite the first end, the retractable mechanism further comprising a shaft rotatably connecting second ends of both respective levers, the retractable wheel mechanism is further configured to cause both levers to move closer together or, when reversed, to move further apart.

3. The modular robot as in claim 1 further equipped with an onboard source of electrical energy to feed a controller and all electrical components thereof.

4. The modular robot as in claim 3, wherein the onboard source of electrical energy is a rechargeable battery, the modular robot is further comprising a wired or wireless battery charger to recharge the rechargeable battery.

5. The modular robot as in claim 4, wherein the wireless battery charger is a wireless RF module operatively connected to the rechargeable battery and configured to recharge thereof.

6. The modular robot as in claim 5, wherein the wireless RF module comprises an induction coil configured for wirelessly charging the rechargeable battery.

7. The modular robot as in claim 1, wherein each wheel is equipped with either an electrical wheel hub motor, or an ultrasonic motor, or piezoelectric motor, the motor is configured for rotating the wheel and contained therein.

8. The modular robot as in claim 1, wherein the non-slip lateral engagement system comprises a wheel protrusion on one side of the wheel with a corresponding void on the other side thereof.

9. The modular robot as in claim 8, wherein the non-slip lateral engagement system further comprises a plurality of teeth or other non-slip engaging elements configured to prevent relative motion of one wheel relative to another wheel when engaged therewith.

10. The modular robot as in claim 8, wherein the non-slip engagement system further comprises a magnetic coupling.

11. The modular robot as in claim 2, wherein the shaft rotatably connecting second ends of both respective levers is motorized and configured upon rotation in one direction to cause respective levers to move towards each other, and upon rotation in an opposite direction to cause respective levers to move away from each other.

12. The modular robot as in claim 1, wherein the retractable mechanism further comprises at least one linear actuator configured to move the wheels thereof laterally along the common wheel axis.

13. The modular robot as in claim 12, wherein the linear actuator is a piezoelectric linear actuator or a piezoelectric linear motor.

14. The modular robot as in claim 1 further equipped with at least one position sensor positioned on at least one cube face.

15. The modular robot as in claim 14, wherein each cube face is equipped with the corresponding position sensor.

16. The modular robot as in claim 1 further comprising an accelerometer configured at least to determine the orientation of the modular robot and the direction of movement thereof.

17. A system of modular robots as in claim 1, the system is adapted for self-configuration and self-assembly between two or more modular robots by engaging corresponding retractable wheel mechanisms of adjacent modular robots with each other.

18. The system as in claim 17, wherein all modular robots are identical to each other.

19. The system of modular robots as in claim 17, wherein each of controllers of the corresponding modular robot is configured to act as a semi-autonomous or autonomous system to perform a predefined program or function.

20. The system of modular robots as in claim 19, wherein each RF module is further configured for wireless transmission and receiving of commands, position information, data and other information needed for performing the predefined program or function.

* * * * *